United States Patent
Langer et al.

(10) Patent No.: US 10,015,749 B2
(45) Date of Patent: Jul. 3, 2018

(54) CLOSED-LOOP POWER CONTROL IN MULTI-TRANSMISSION WIRELESS SYSTEMS

(71) Applicant: Intel IP Corporation, Santa Clara, CA (US)

(72) Inventors: Andreas Langer, Lohhof (DE); Thomas Bruder, Grafing (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/865,369

(22) Filed: Sep. 25, 2015

(65) Prior Publication Data

US 2017/0094608 A1    Mar. 30, 2017

(51) Int. Cl.
| | |
|---|---|
| H04B 7/00 | (2006.01) |
| H04W 52/08 | (2009.01) |
| H04B 1/00 | (2006.01) |
| H04W 52/34 | (2009.01) |

(52) U.S. Cl.
CPC .......... *H04W 52/08* (2013.01); *H04B 1/0057* (2013.01); *H04W 52/34* (2013.01)

(58) Field of Classification Search
CPC ..... H04W 52/08; H04W 52/34; H04B 1/0057
USPC ..................... 455/522, 552.1, 525
See application file for complete search history.

(56) References Cited

U.S. PATENT DOCUMENTS

| | | | | |
|---|---|---|---|---|
| 5,878,332 A * | 3/1999 | Wang | ...................... | H04B 1/005 455/103 |
| 6,356,770 B1 * | 3/2002 | Ishida | ..................... | H04B 1/005 370/347 |
| 7,373,171 B2 * | 5/2008 | Nakai | ................... | H04B 1/0057 333/100 |
| 7,643,848 B2 * | 1/2010 | Robinett | ................ | H04B 1/006 455/103 |
| 9,026,127 B2 | 5/2015 | Ngai et al. | | |
| 9,853,683 B2 * | 12/2017 | Khlat | ....................... | H04B 1/44 |
| 2001/0006888 A1 * | 7/2001 | Posti | .................... | H04L 27/2614 455/69 |

(Continued)

OTHER PUBLICATIONS

Extend European Search Report dated Feb. 20, 2017 for European Application No. 16185156.3-1874.

*Primary Examiner* — Md Talukder
(74) *Attorney, Agent, or Firm* — Eschweiler & Potashnik, LLC

(57) ABSTRACT

Techniques for closed loop power control in multi-transmission systems are discussed. One example system employing such techniques can include coupling circuitry configured to receive a transmission path signal comprising a plurality of signal components, wherein the plurality of signal components comprises at least a first signal component in a first frequency band and a second frequency component in a second frequency band distinct from the first frequency band; filter circuitry configured to receive the transmission path signal from the coupling circuitry, to separate the first signal component from the second signal component, and to separately output the first signal component and the second signal component; and power control circuitry configured to receive the first signal component and the second signal component, and to generate a first power control signal based on the first signal component and a second power control signal based on the second signal component.

15 Claims, 8 Drawing Sheets

(56) References Cited

U.S. PATENT DOCUMENTS

| | | | | |
|---|---|---|---|---|
| 2001/0010684 A1* | 8/2001 | Willenegger | H04W 52/08 | 370/311 |
| 2005/0135312 A1* | 6/2005 | Montojo | H04L 5/0044 | 370/335 |
| 2005/0245213 A1* | 11/2005 | Hirano | H03F 1/0205 | 455/127.1 |
| 2008/0132193 A1* | 6/2008 | Petrovic | H04B 1/28 | 455/323 |
| 2011/0081936 A1* | 4/2011 | Haim | H04W 52/367 | 455/522 |
| 2012/0021704 A1* | 1/2012 | Chan | H03G 3/3042 | 455/95 |
| 2013/0244722 A1* | 9/2013 | Rousu | H04B 1/16 | 455/552.1 |
| 2014/0295909 A1* | 10/2014 | Ouchi | H04W 52/242 | 455/522 |

* cited by examiner

Example UE

CLOSED-LOOP POWER CONTROL IN MULTI-TRANSMISSION WIRELESS SYSTEMS

FIELD

The present disclosure relates to communications technology and more specifically to techniques for closed loop power control in systems employing simultaneous transmission in more than one frequency band.

BACKGROUND

Accurate control of output power of a wireless system (e.g., a user equipment (UE), a base station such as an Evolved Node B (eNB), etc.) is important for several reasons. In frequency division duplexing (FDD) systems, the power control ensures accurate power step sizes and proper setting of the maximum output power. If the actual output power gets higher than the maximum linear output power capability of the wireless system, then linearity performance metrics such as the adjacent channel leakage ratio (ACLR) and error vector magnitude (EVM) will degrade. The accurate control of the maximum linear output power is one of the key tasks of a power control scheme.

FDD systems have tight requirements when changing the output power. In such systems, the relative power tolerance is more important than the absolute tolerance. For example, the Third Generation Partnership Project (3GPP) Technical Specification (TS) 25.101 requires, for 3G FDD systems, a maximum error of ±0.5 dB for every 1 dB change in output power.

For time division duplexing (TDD) systems such as the Global System for Mobile Communications (GSM) or Long Term Evolution (LTE) TDD implementations, the absolute power tolerance is more important than for FDD systems. TDD systems feature discontinuous transmission normally implemented as a slot-wise transmission. At the beginning of each transmit slot, the output power ramps up to the desired target value during the transmit slot. After each transmit slot, the power ramps down to a specified minimum level. In LTE TDD systems, the challenge is to ramp-up from a low output power (e.g., <−40 dBm for LTE TDD) to up to 23 dBm, depending on the target power for the transmit slot, while keeping the output power tolerances and without exceeding the maximum output power capability of the wireless system.

Thus, power control is an important task for wireless systems, and remains just as important in systems with simultaneous transmission in two or more frequency ranges.

DETAILED DESCRIPTION

Figure 1:
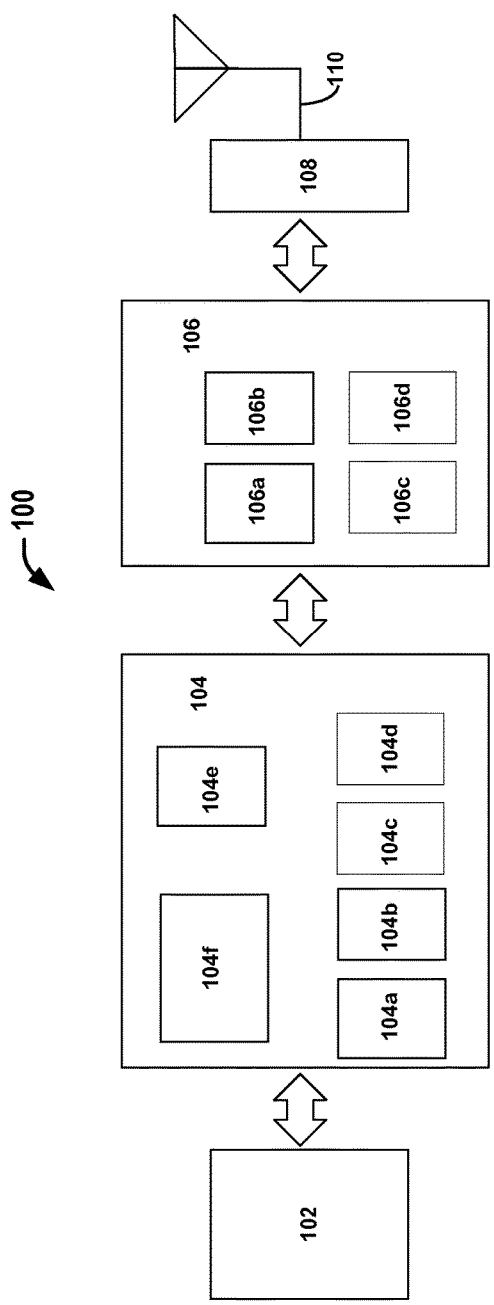
FIG. 1 is a block diagram illustrating an example user equipment (UE) useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 illustrates, for one embodiment, example components of a User Equipment (UE) device 100. In some embodiments, the UE device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuitry 104 may interface with the application circuitry 102 for generation and processing of the baseband signals and for controlling operations of the RF circuitry 106. For example, in some embodiments, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), precoding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 104f. The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106*d*. The amplifier circuitry 106*b* may be configured to amplify the down-converted signals and the filter circuitry 106*c* may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106*a* of the receive signal path may comprise passive mixers, although the scope of the embodiments is not limited in this respect.

In some embodiments, the mixer circuitry 106*a* of the transmit signal path may be configured to up-convert input baseband signals based on the synthesized frequency provided by the synthesizer circuitry 106*d* to generate RF output signals for the FEM circuitry 108. The baseband signals may be provided by the baseband circuitry 104 and may be filtered by filter circuitry 106*c*. The filter circuitry 106*c* may include a low-pass filter (LPF), although the scope of the embodiments is not limited in this respect.

In some embodiments, the mixer circuitry 106*a* of the receive signal path and the mixer circuitry 106*a* of the transmit signal path may include two or more mixers and may be arranged for quadrature downconversion and/or upconversion respectively. In some embodiments, the mixer circuitry 106*a* of the receive signal path and the mixer circuitry 106*a* of the transmit signal path may include two or more mixers and may be arranged for image rejection (e.g., Hartley image rejection). In some embodiments, the mixer circuitry 106*a* of the receive signal path and the mixer circuitry 106*a* may be arranged for direct downconversion and/or direct upconversion, respectively. In some embodiments, the mixer circuitry 106*a* of the receive signal path and the mixer circuitry 106*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106*d* may be a fractional-N synthesizer or a fractional N/N+1 synthesizer, although the scope of the embodiments is not limited in this respect as other types of frequency synthesizers may be suitable. For example, synthesizer circuitry 106*d* may be a delta-sigma synthesizer, a frequency multiplier, or a synthesizer comprising a phase-locked loop with a frequency divider.

The synthesizer circuitry 106*d* may be configured to synthesize an output frequency for use by the mixer circuitry 106*a* of the RF circuitry 106 based on a frequency input and a divider control input. In some embodiments, the synthesizer circuitry 106*d* may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106*d* of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110.

In some embodiments, the UE device 100 may include additional elements such as, for example, memory/storage, display, camera, sensor, and/or input/output (I/O) interface.

Systems and techniques disclosed herein address the problem of power control in wireless systems supporting simultaneous transmission in more than one frequency band, such as inter-band uplink (UL) carrier aggregation (CA), multiple-SIM (subscriber identity module) multiple-active (MSMA) technologies such as dual-SIM dual-active (DSDA), or other technology featuring parallel transmission. In systems with simultaneous transmission, accurate power control becomes a major issue, especially in single antenna configurations wherein the total transmit signal for an antenna comprises two or more signals mapped to two or more frequency ranges.

Embodiments provided herein can enable closed loop power control in systems employing multi-transmission (e.g., simultaneous transmission in two or more frequency bands, etc.). Closed loop power control is basically a closed loop regulation. The measured transmit power can be compared with a target output power. The difference can be applied to a regulator that controls the power, for example, by changing the input power of the power amplifier (PA) until the difference between the measured power and the target power becomes zero, or falls below a predefined threshold or control deviation. This assumes that the output power of the PA can be adjusted by changing its input power. The corresponding PAs are controlled via input power, which is the normal case for linear PAs. It is also possible the change the output power of a PA by changing the PA bias (e.g., the quiescent current, the supply voltage, or both). In some systems, this was common practice by Gaussian minimum shift keying (GMSK) PAs, due to saturation operation. Aspects discussed herein are not limited to input power controlled devices, although example embodiments provided herein focus on input power ramping due to the practical relevance for linear systems. However, in various embodiments, techniques discussed herein can also be applied for closed loop power control of bias controlled PAs.

Closed loop power control provides tight power tolerances that are mainly given by the accuracy of the power measurement. The advantages of closed loop power control can be especially effective in systems with non-constant envelopes and/or ultra-fast transition times.

In multi-transmission systems, accurate power measurement is a major issue. Multi-transmission systems are systems where two or more transmit chains work in parallel at the same time. This parallel operation is a new issue in mobile terminals, and driven by new features such as UL CA (uplink carrier aggregation), MSMA (multiple-SIM multiple active) (e.g., DSDA, dual-SIM dual active), and TX (transmit)-MIMO (multiple-input multiple-output) technologies.

UL CA is an LTE advanced (LTE-A) feature. LTE-A is an evolutionary path from LTE Release 8 (Rel-8), and introduced by Release 10 (Rel-10) of the 3GPP standardization. One new feature of Rel-10 is carrier aggregation (CA). To achieve higher data rates, two or more component carriers (CCs) can be aggregated to support a transmission bandwidth of up to 100 MHz. However, initial LTE-A deployments will be likely limited to two component carriers in the uplink, which means a maximum bandwidth of 40 MHz. Inter-band CA is particularly relevant to the issue of multi-transmission power control. In inter-band CA, the wireless system (e.g., UE, eNB, etc.) can potentially transmit in two different bands at the same time. The output power contributions of the different transmit chains can be, for example, combined by antenna multiplexing or by a frequency multiplexer (e.g., diplexer, etc.) that is connected to a common antenna. Antenna multiplexing means that each transmit chain is associated with a distinct antenna. By means of a frequency multiplexer (e.g., diplexer, etc.), two or more transmit chains operating at different frequencies share a single antenna. These single antenna multi-transmission situations are poorly addressed by conventional power control techniques.

MSMA technologies such as DSDA are new multi-SIM technologies which have stringent operating requirements. For example, for DSDA, depending on the DSDA implementation, two radio access technologies (RATs) are working independently at the same time. In one example, a 2G (second generation wireless technology) call associated with a first SIM card, and an LTE data transfer associated with a second SIM card are operating at the same time. Both of these RATs are not synchronized with one another, so that simultaneous transmission occurs, as does transmission on the first RAT (the 2G call) and reception on the second RAT (LTE data transfer). DSDA technology presents implementation challenges for radio frequency (RF) front-ends, due to the stringent isolation requirements between different RATs.

One issue with multi-transmission is the limited isolation between the simultaneously operating transmit chains. In the case of a single antenna or a single antenna feed, the transmit power consists of at least two signals mapped to different frequency ranges. With conventional power control techniques, however, the power sensor would measure the sum of all of the transmit signals, preventing closed loop power control of individual signals.

However, aspects discussed herein can facilitate power control in a system featuring multi-transmission, and can capture the powers at the distinct operating frequencies of the distinct transmit chains. Thus, embodiments discussed herein can facilitate accurate closed loop power control in systems featuring parallel transmission (in addition to single transmission power control), in contrast to conventional systems, which cannot provide effective power control in situations involving multi-transmission.

Figure 2:
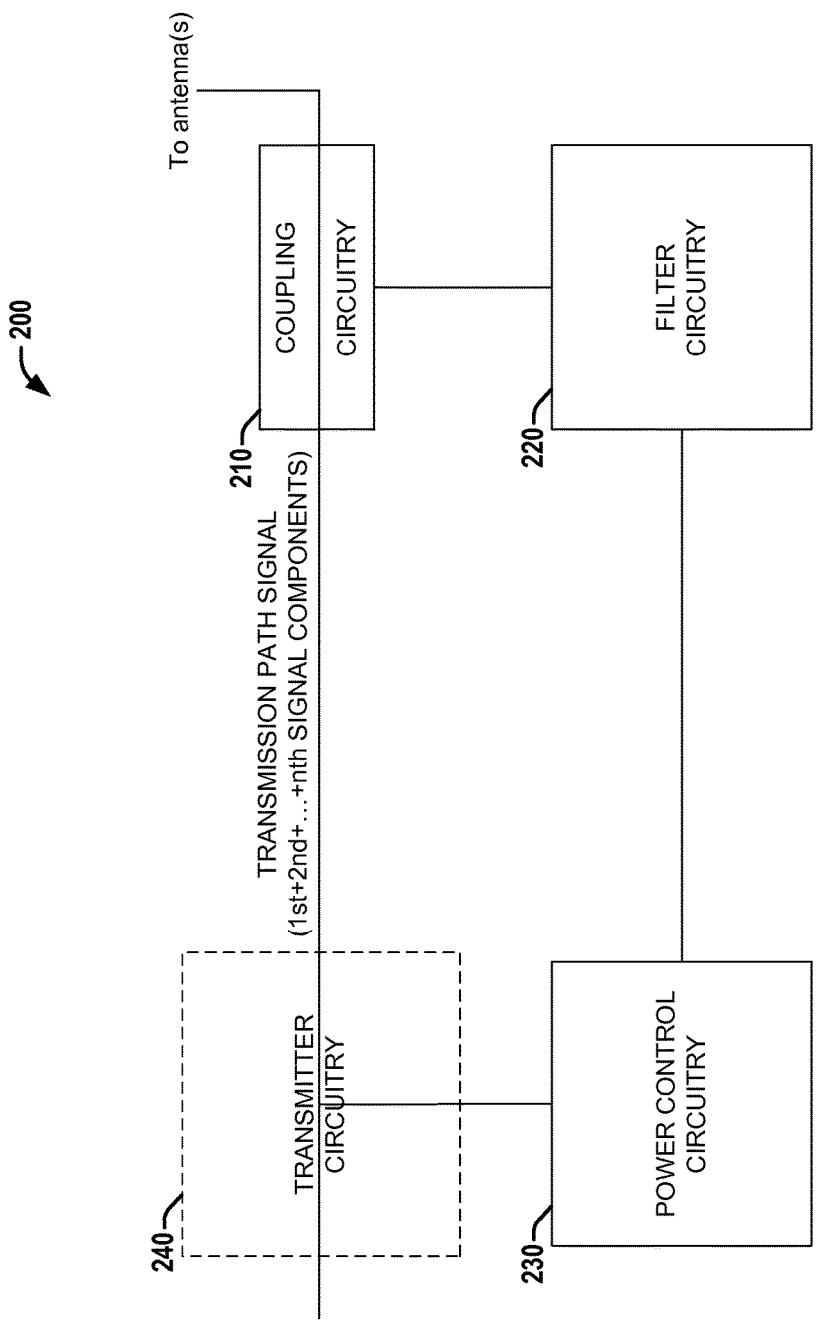
FIG. 2 is a block diagram illustrating an example system that facilitates closed loop power control in multiple transmission bands according to various aspects described herein.

Referring to FIG. 2, illustrated is a block diagram of an example system 200 that facilitates closed loop power control in a multi-transmission system (e.g., wireless or wired), according to various aspects described herein. System 200 can be employed in a variety of wireless systems, for example, in a transmitter or transceiver of a UE or eNB. In various embodiments, system 200 can include coupling circuitry 210, filter circuitry 220, power control circuitry 230, and optionally transmitter circuitry 240.

Coupling circuitry 210 can receive a transmission path signal, for example, via one or more couplers coupled to an output of a power amplifier (PA) or to multiple power amplifiers (PA). In various aspects, the transmission path signal can comprise one or more signal components, each of which can be associated with distinct frequency bands (e.g., a first signal component in a first frequency band, a second signal component in a second signal band, up to an nth signal component in an nth frequency band). The multiple signal components can be associated with the same RAT (e.g., via UL CA, etc.), with different RATs (e.g., MSMA such as DSDA, etc.), or with a combination thereof (e.g., first and second signal components associated with a first RAT employing two transmit paths for UL CA, and a third signal component associated with a second RAT). Additionally, the transmission path signal received by coupling circuitry 210 can be a forward transmission path signal (e.g., for closed loop power control aspects), a reverse transmission path signal (e.g., for determining antenna impedance, etc.), or a combination thereof (e.g., with both processed separately or in parallel).

Filter circuitry 220 can receive the transmission path signal from the coupling circuitry, and can separate the signal components of the transmission path signal from one another via filters of filter circuitry 220. Additionally, filter circuitry 220 can separately output the separated signal components to power control circuitry 230. In some embodiments discussed herein, filter circuitry 220 can comprise a plurality of individual filters from which two or more individual filters can be selected to separate the signal components. In other embodiments, filter circuitry 220 can comprise one or more frequency multiplexers (e.g., diplexers, triplexers, etc.) that can separate the signal components.

For example, for each signal component, a set of filters can be selected that can pass that signal component and filter out the other signal components. For example, for a first signal component in a first frequency band at a lower frequency than a second signal component in a second frequency band, a first set of filters (e.g., a lowpass filter, a bandpass filter, etc.) can pass the first signal component and filter out the second signal component along a first path, while a second set of filters (e.g., a highpass filter, a bandpass filter, etc.) can pass the second signal component and filter out the first signal component along a second path. In examples with three or more signal components, a lowpass or bandpass filter can be employed for the signal component in the lowest frequency band along a first path, a highpass or bandpass filter can be employed for the signal component in the highest frequency band along a second path, and bandpass filters can be employed for the remaining signal components along other paths. The specific characteristics of the filters employed can depend on the specific signal components in the transmission path signal.

In some embodiments, one or more filters of filter circuitry 220 can be tunable filters, and can be tuned to different filter characteristics for each of a plurality of frequency bands that can be separately output by a path comprising such a tunable filter or filters. For example, in the example filter arrangement of FIG. 6, discussed in greater detail below, filter A can be employed to pass any of LTE bands 5, 8, 12, 20, or 28. In some aspects, a higher cutoff frequency can be employed, for example, with band 8 than with band 20, by tuning filter A based on the frequency band to pass through filter A.

In the same or other embodiments, filter circuitry 220 can include a plurality of filters that are switchably connected to the coupling circuitry 210, and based on the frequency bands of the signal components of the transmission path signal, filter circuitry 220 can selectively connect filters to coupling circuitry 210 to select filters based on the specific frequency bands in the transmission path signal.

In the same or other embodiments, filter circuitry 220 can include one or more frequency multiplexers that be selectively connected to coupling circuitry 210, such as by switchably connecting each frequency multiplexer to the same coupler or to distinct couplers of coupling circuitry 210. Each of the frequency multiplexers can be configured to separate a distinct (although potentially overlapping) set of combinations of frequency bands (e.g., a first multiplexer might separate bands {A, B, and C} or {D, B, and C}, while a second multiplexer might separate bands {A, B, and C} or {A, B, and E}). Based on the frequency bands of the signal components of the transmission path signal, filter circuitry 220 can select a multiplexer of the plurality of multiplexers to separate the signal components.

Power control circuitry 230 can receive the separated signal components, and can determine a power of each of the separated signal components. Based on each determined power, power control circuitry 230 can generate an associated power control signal for each of the signal components (e.g., a first power control signal for the first signal component, a second power control signal for the second signal component, etc.). Power control circuitry 230 can output each power control signal, for example, to an associated PA that generates the associated signal component. Each power control signal can control the output power of that PA, for example, by controlling an input power (or a bias) of the PA as a form of feedback to ensure that the output power of the PA is at a target output power within some threshold (e.g., as defined by a specification associated with the RAT).

Transmitter circuitry 240, when included, can receive a plurality of data signals (e.g., a first data signal, a second data signal, etc., which can be, in wireless or wired system embodiments, be baseband signals), and generate a transmission path signal component associated with each of the plurality of data signals (e.g., via a plurality of parallel transmit chains, etc.). Transmitter circuitry 240 can combine the plurality of signal components to generate the transmission path signal, which can be output to a port for transmission (e.g., antenna port for wireless systems, etc.). Transmitter circuitry 240 can receive the power control signals from power control circuitry 230 and adjust the output power of the signal components based on the associated power control signals. In other embodiments, system 200 can receive a transmission path signal from and output power control signals to transmitter circuitry external to system 200, etc.

Figure 3:
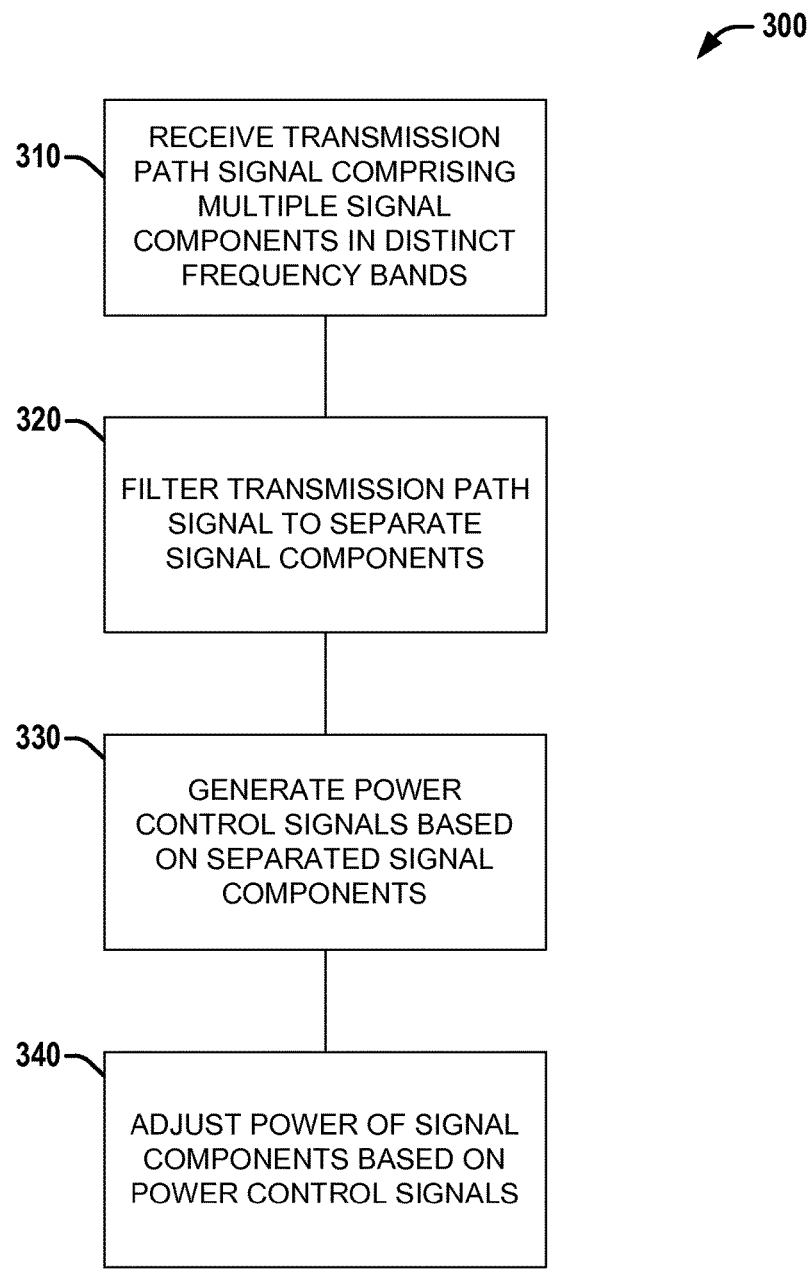
FIG. 3 is a flow diagram illustrating an example method facilitating closed loop power control in multiple transmission bands according to various aspects described herein.

Referring to FIG. 3, illustrated is an example method 300 of facilitating closed loop power control in multiple transmission bands according to various aspects described herein.

Method 300 can include, at 310, receiving a transmission path signal (e.g., via coupling circuitry comprising one or more couplers, etc.) that can include one or more signal components, each of which is associated with a distinct frequency band (e.g., distinct signal components associated with inter-band uplink carrier aggregation, multi-SIM multi-active technology, etc., including combinations thereof).

At 320, method 300 can include filtering the transmission path signal to separate the signal components from one another. In some embodiments, filtering the transmission path signal can include selecting a filter for at least some of the signal component, wherein each selected filter passes that signal component and filters out the other signal components. The transmission path signal can be directed down parallel filter paths, each associated with a selected filter, to separate the signal components. In the same or other embodiments, one or more frequency multiplexers (e.g., diplexers, triplexers, etc.) can be selected or otherwise have the transmission path signal directed through them (e.g., by selecting an associated coupler of a plurality of couplers, etc.), such that the one or more frequency multiplexers separate some or all of the signal components.

At 330, for each of the separated signal components, a distinct power control signal can be generated.

At 340, the power of each signal component can be adjusted based on the associated power control signal generated at 330.

In various embodiments, systems and methods discussed herein can employ a plurality of filters (to form a switchable frequency multiplexer) or one or more fixed frequency multiplexers in a feedback path of a power control system between coupling circuitry comprising one or more couplers and power control circuitry comprising one or more power sensors.

Filter circuitry comprising one or more frequency multiplexers or a plurality of filters (e.g., that can be switchably selected) can receive a portion of a total transmission path signal (e.g., via one or more couplers) comprising a plurality of signal components mapped to distinct frequency ranges (e.g., a first signal component in a first frequency range, a second signal component in a second frequency range, etc.). The filter circuitry can disaggregate the transmission path signal, providing separated signal components (e.g., a first signal component mapped to a first frequency range at a first output, a second signal component mapped to a second frequency range at a second output, etc.). At each output of the filter component, the contribution of other signal components filtered out along that path are sufficiently suppressed by the transfer function of the filters and/or frequency multiplexer such that accurate power measurement of the signal component passed by that path is not corrupted by the other signal components. For example, along a first path, the first signal component is passed and all other signal components are sufficiently suppressed, and similarly along a second path, etc. Each output of the filter circuitry can be connected to a distinct input of the power control circuitry (e.g., a first output of the filter circuitry passes the first signal component to a first input of the power control circuitry, etc.). The power control circuitry can provide for independent control of the transmit power of each of the signal components provided at its inputs.

The filter circuitry can separate multiple signal components, with all or some of the signal components transmitted simultaneously. When the transmission path signal comprises at most N signal components out of a possible M signal components (where N<M), embodiments can comprise filter circuitry with N outputs and power control circuitry with N inputs, while being capable of filtering any combination of N of the possible M signal components. In one example, for a maximum of two simultaneously transmitted signal components out of a possible three signal components, a first path of the filter circuitry can be configured to pass the first or the second signal component, while a second path can be configured to pass the second or the third signal component, allowing for any combination of the first, second, and third signal components to be separated (other combinations can be employed in other embodiments).

Additionally, in various aspects, filters or frequency multiplexers of the filter circuitry can be tunable, wherein the filtering characteristics of the filters or frequency multiplexers can be optimized depending on one or more of the transmit frequencies of the signal components, the frequency separation between those transmit frequencies, or other characteristics.

Figure 4:
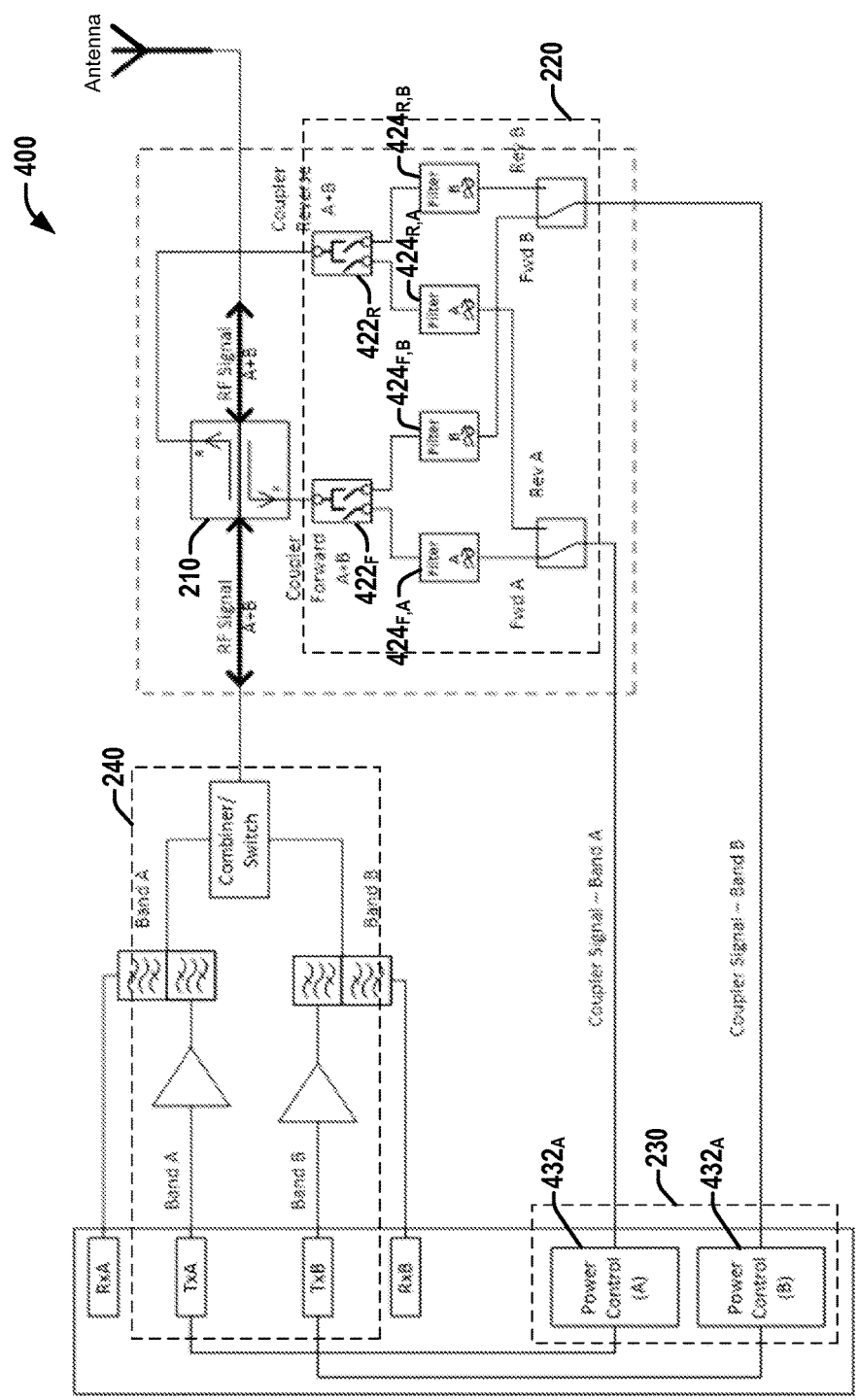
FIG. 4 is a block diagram illustrating one example embodiment of a system that can provide closed loop power control for multiple simultaneous transmissions, according to various aspects described herein.

Referring to FIG. 4, illustrated is a block diagram showing one example embodiment of a system 400 that can provide closed loop power control for multiple simultaneous transmissions, according to various aspects described herein. The example embodiment of system 400 provides for closed loop power control of two simultaneously transmitted signal components in two arbitrary frequency bands (labeled bands A and B), although similar embodiments can provide for closed loop power control of greater numbers of simultaneously transmitted signal components. The coupling circuitry 210 of system 400 can provide for capture of either forward or (optionally) reverse transmission path signals (e.g., wherein the reverse signal can be employed for advanced transmit procedures such as determining the antenna impedance). The filter circuitry 220 can selectively couple filters to either the forward or (when included) reverse transmission path signals, separating the signal components for bands A and B, and providing the separated signal components to power control circuitry 230. Power control circuitry 230 can generate power control signals that can adjust the output power of the signal components generated by transmitter circuitry 240 (e.g., via input power control, bias control, etc.).

In connection with a forward transmission path signal, that forward transmission path signal can be fed back into the power control circuitry 230 via filter circuitry 220. The power control circuitry 230 can measure the power, compare the measured power with a target power, and generate corrective signals (power control signals) that minimize the different between the measured power and the target power. In aspects, such as those shown in FIG. 4, separate power control circuitry $432_A$ and $432_B$ can be provided for each band, similar to power control circuitry conventionally employed in control of a single signal component in a single frequency band (in other aspects, differing circuitry configurations can be employed for power control circuitry 230 to provide distinct power control signals for each received signal component).

Aspects described herein can facilitate separation of a plurality of signal components for closed loop power control of those signal components, including during time periods when two or more signal components are transmitted simultaneously (e.g., in parallel operation).

In example system 400, when the forward path is selected, forward path filter A ($424_{F,A}$) and forward path filter B ($424_{F,B}$) of filter circuitry 220 effectively form a diplexer (similar aspects apply on the reverse path with filters $424_{R,A}$ and $424_{R,B}$). When both arms of the switch $422_F$ in front of the forward path filters $424_{F,A}$ and $424_{F,B}$ are closed, a diplexer is formed. This means that filters $424_{F,A}$ and $424_{F,B}$, which are through-connected at their inputs, create a diplexer network with a characteristic that is defined by the characteristics of filters $424_{F,A}$ and $424_{F,B}$.

Depending on the transmit frequencies, filters $424_{F\ or\ R,A}$ and $424_{F\ or\ R,B}$ can be a combination of lowpass and highpass filters. However, bandpass filters can also be employed as either of filters $424_{F\ or\ R,A}$ and $424_{F\ or\ R,B}$. The filter characteristic of filter $424_{F\ or\ R,A}$ (having its passband at frequency band A) and of filter $424_{F\ or\ R,B}$ (having its passband at frequency band B) can be selected to provide a high impedance in the other band (e.g., filter $424_{F\ or\ R,A}$ can have a high impedance in band B, and vice versa, etc.). This can provide a high isolation between the frequency bands, and low insertion loss. However, the isolation is more important than the insertion lows. Insertion loss in a feedback path is less relevant, since there is already a high attenuation required for reducing the transmit power to prevent overdriving the power control circuitry. If the isolation is too low, the power measurement of the band A signal component can be corrupted by the band B signal component, and/or vice versa.

However, a switchable diplexer such as shown in FIG. 4 is not required in many situations, such as when the frequency ranges of the relevant signal components have a large frequency separation. For example, one relevant application is LTE carrier aggregation with a first transmit signal component (e.g., signal component A) from a low band frequency region (e.g., 698-915 MHz, for example, LTE bands B12, B13, B20, B26, B8, etc.) and a second signal component from a mid frequency region (e.g., 1710-2025 MHz, for example, LTE bands B1, B3, B4, B34, B25, etc.). In such aspects, a fixed diplexer (or other frequency multiplexer, when separating more than two signal components) can also work, as the frequency separation is large enough that a diplexer with a single cross-over frequency can be employed.

However, in other example situations, multiple combinations of frequency bands may not be separable with a fixed diplexer (or other fixed frequency multiplexer). One such example situation occurs when the combined signal components can include bands out of a low band (LB) region (e.g., B12, B13, B20, B26, B8, etc.), bands out of a mid-low band (MLB) region (e.g., B21), bands out of a middle band (MB) region (e.g., B1, B3, B4, B25), and bands out of a high band (HB) region (e.g., B30, B40, B7, B41). Considering the case of separating two combined frequency bands, a fixed diplexer would not be able to separate all combinations of pairs of signal components from distinct band regions (e.g., B12+B1, B12+B7, B8+B21, B21+B1, B1+B41, etc.)

For example, B8+B21 could be separated with a diplexer having a cross-over frequency of around 1190 MHz (assuming mid frequency as the selection criterion for the cross-over frequency of the diplexer), while B1+B21 would be separated with a diplexer having a cross-over frequency of around 1691 MHz, thus both combinations would not be supported by a single fixed diplexer. A fixed diplexer having a cross-over frequency of around 1691 MHz would not be able to separate B8+B21, while a fixed diplexer having a cross-over frequency of around 1190 MHz would not be able to separate B1+B21 (other combinations of potential signal components similarly are unable to be separated by a single fixed diplexer, such as B12+B1 and B1+B4).

To provide for simultaneous closed loop power control of various combinations of multiple simultaneous signal components, aspects of the subject innovation can provide more sophisticated multiplexing along the feedback path (e.g., through system 200, etc.) than a single fixed frequency multiplexer (e.g., diplexer, etc.).

Figure 5:
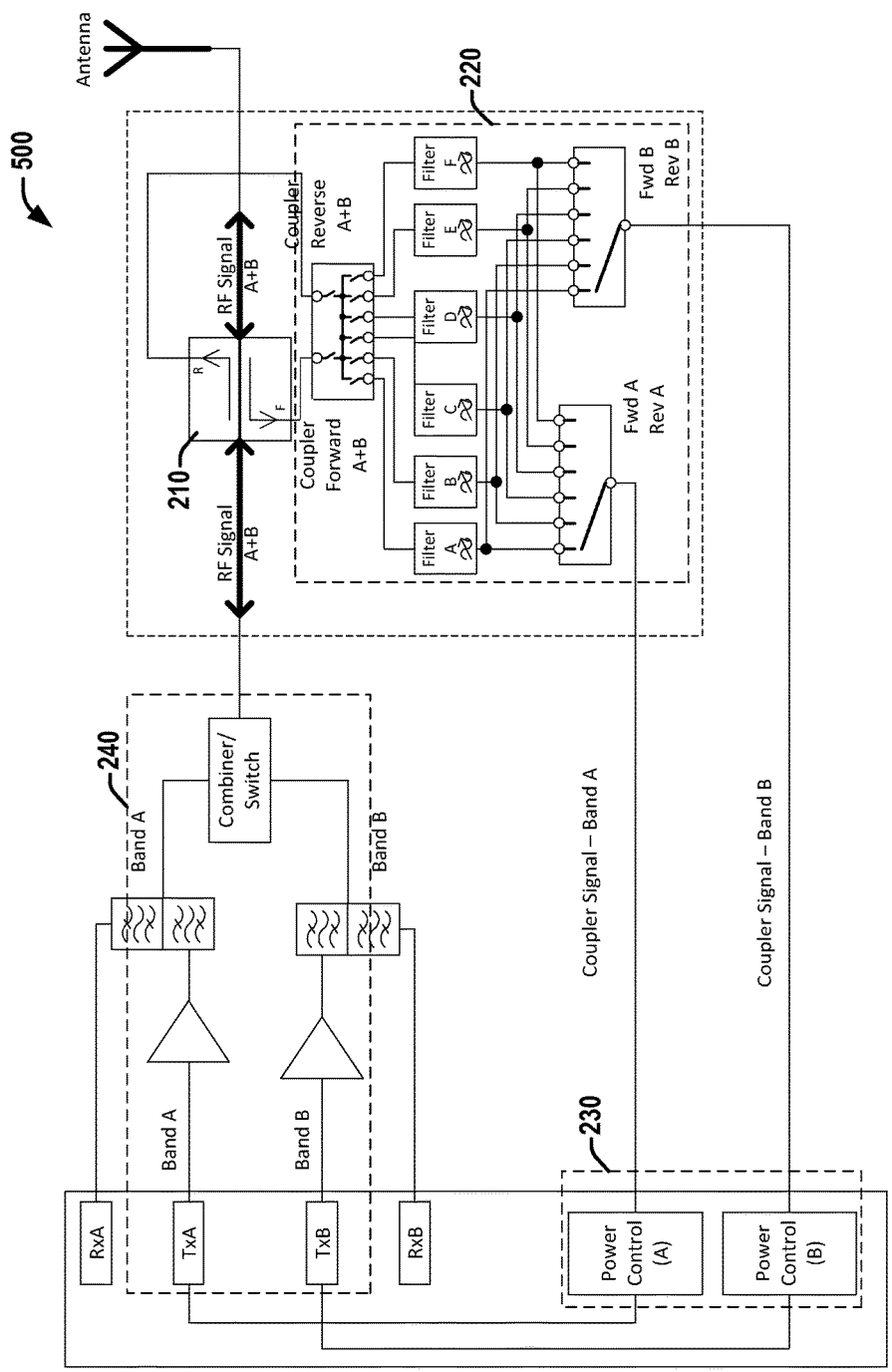
FIG. 5 is an illustration of an example system that can facilitate closed loop power control of two simultaneously transmitted signal components according to aspects described herein.
Figure 6:
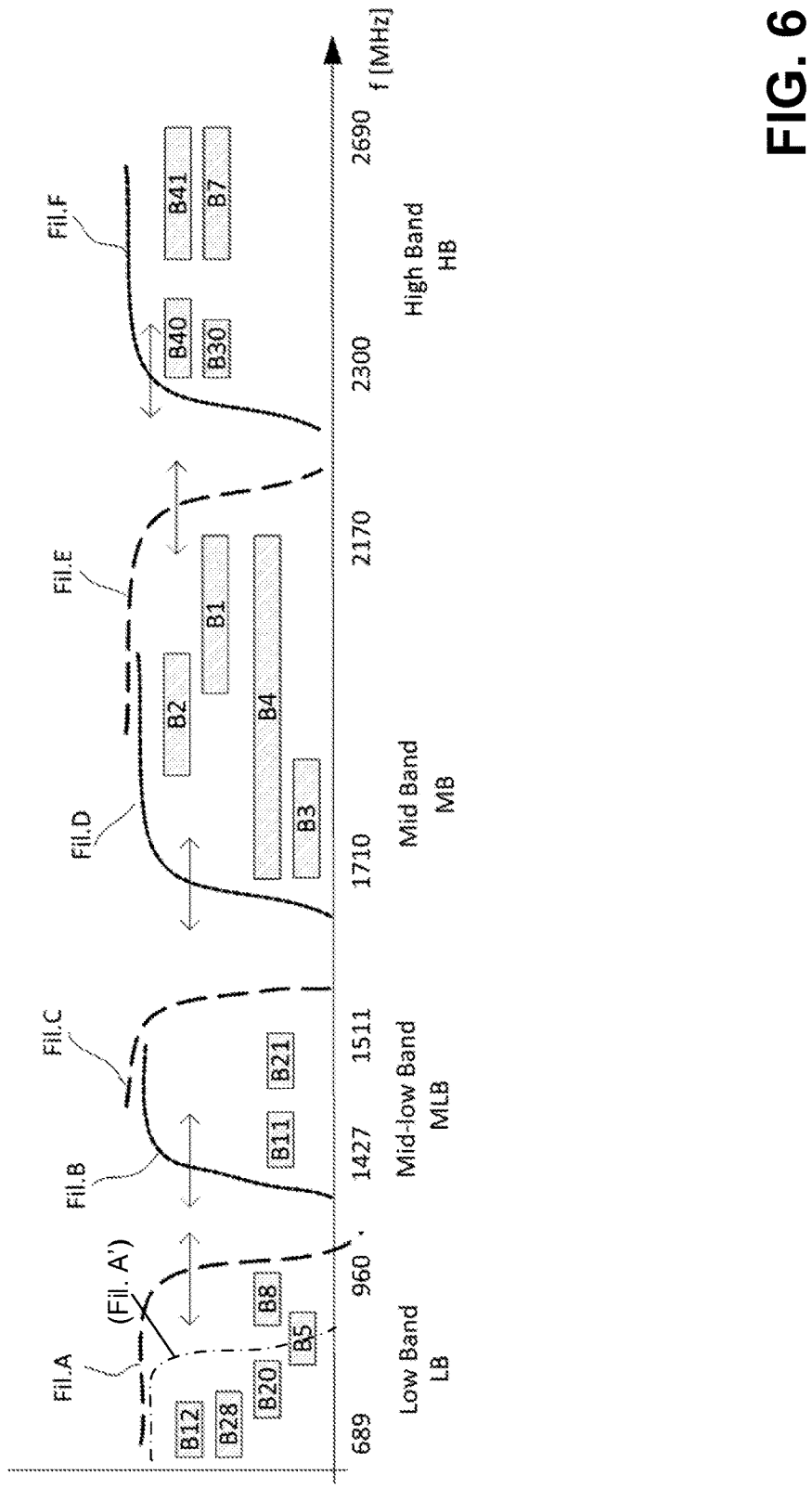
FIG. 6 is an illustration of example filter characteristics, including approximate cut-off frequencies, of filters A-F from FIG. 5.

Referring to FIG. 5, illustrated is an example system 500 that can facilitate closed loop power control of two simultaneously transmitted signal components according to aspects described herein. Although, for simplicity, example system 500 is show to separate two signal components, aspects described herein can similarly provide for separation of more than two signal components. In the filter circuitry 220 of system 500, six filters can be employed to support the possible combinations of signal components from the four band regions discussed above (LB, MLB, MB, and HB). FIG. 6 illustrates example filter characteristics, including approximate cut-off frequencies, of filters A-F of system 500. Additionally, in some aspects, some or all of the filters discussed herein can be tunable filters. For example, a filter characteristic similar to the dashed line of filter A can be employed for LTE band B8, while the dashed and dotted line indicated as filter A' indicates an example tuning of filter A that can be employed for LTE band B20. In various aspects, each band can be associated with a single predetermined tuning of an associated filter (e.g., the only tuning for a non-tunable filter, or one of multiple tunings for a tunable filter).

For example system 500, depending on the CA combination, two switch arms of the input switch of filter circuitry 220 (located at the input of the filters) can be closed, creating a diplexer function. The following are examples of filter combinations that can be employed for various combinations of LTE bands: for B12+B21, selecting filters A+B; for B21+B1, selecting filters C+D; for B12+B40, selecting filters A+F, E+F, or C+F (in aspects, which pair is selected can depend on which pair provides the best isolation performance); for B1+B40, selecting filters E+F; etc. The switches at the output of filters A-F connect the selected filter outputs to the inputs of the power control circuitry 230.

Although there are multiple switches in system 500, the insertion loss of the switches is much less important than the isolation provided, and the power capability of the switches can be low (e.g., below 10 dBm), which can help to reduce die area (e.g., silicon-on-insulator die, etc.), allowing for a cost-efficient implementation.

Figure 7:
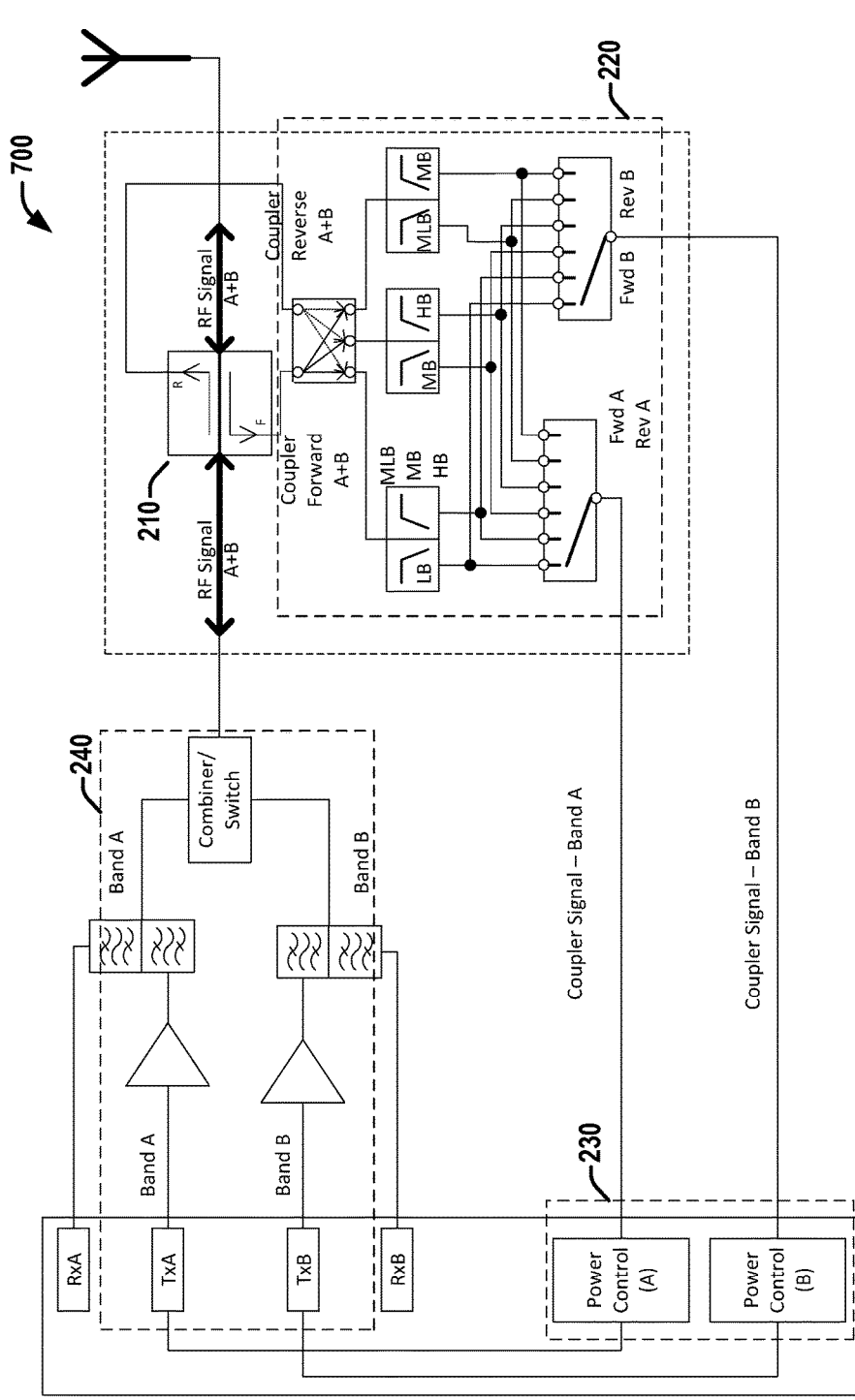
FIG. 7 is an illustration of an example system that can facilitate closed loop power control of two simultaneously transmitted signal components via fixed diplexers according to aspects described herein.

Referring to FIG. 7, illustrated is an example system 700 that can facilitate closed loop power control of two simultaneously transmitted signal components via fixed diplexers according to aspects described herein. As can be seen in FIG. 7, the coupling circuitry 210, power control circuitry 230, and transmitter circuitry 240 of system 700 can be similar to those of system 500. The filter circuitry 220 of system 700 can employ a plurality of switchable diplexers to separate different signal components from each other depending on the frequency bands of those signal components, with the frequency bands separable labeled on the diplexers (e.g., LB from MLB, MB, or HB; MB from HB; and MLB from MB). In aspects employing tunable diplexers (or other tunable frequency multiplexers), the number of diplexers (or frequency multiplexers) can be reduced, which can provide performance improvements.

Figure 8:
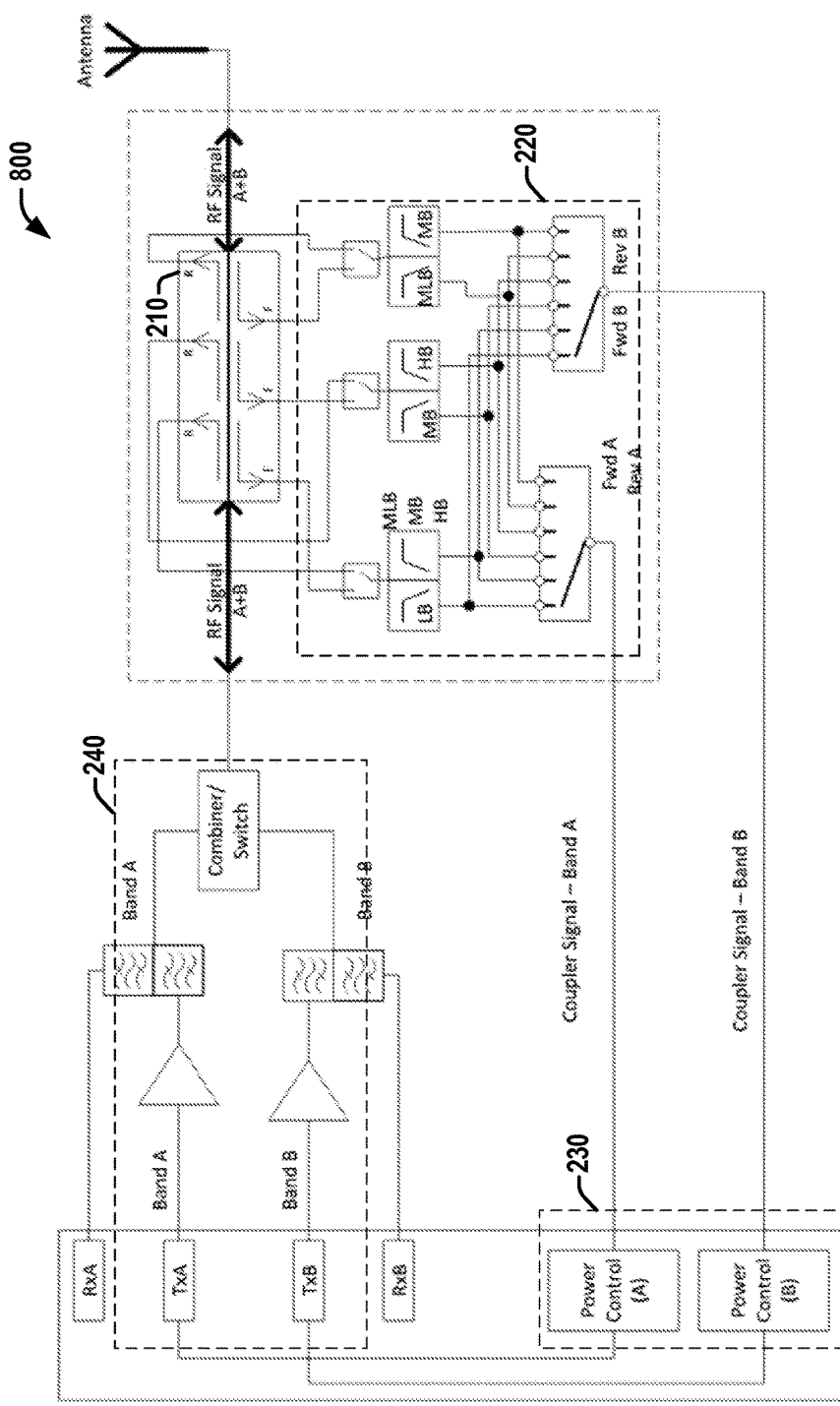
FIG. 8 is an illustration of another example system that can facilitate closed loop power control of two simultaneously transmitted signal components via fixed diplexers according to aspects described herein.

Referring to FIG. 8, illustrated is another example system 800 that can facilitate closed loop power control of two simultaneously transmitted signal components via fixed diplexers according to aspects described herein. As can be seen in FIG. 8, system 800 can be similar to system 700, but can employ multiple couplers (e.g., one coupler for each diplexer) in coupling circuitry 210 instead of switchably selecting which diplexer of the filter circuitry 220 is connected to the coupling circuitry 210.

For embodiments with more than two simultaneous signal components, further switches (e.g., third, etc.) can be closed to connect to further power control circuitry (e.g., third, etc.) (not shown) that control the power along further parallel transmit paths (e.g., etc.) (not shown). In such aspects, bandpass filters can be employed for at least the MLB and MB regions.

Examples herein can include subject matter such as a method, means for performing acts or blocks of the method, at least one machine-readable medium including executable instructions that, when performed by a machine (e.g., a processor with memory or the like) cause the machine to perform acts of the method or of an apparatus or system for concurrent communication using multiple communication technologies according to embodiments and examples described.

Example 1 is a system configured for use in a transmitter, comprising coupling circuitry, filter circuitry, and power control circuitry. The coupling circuitry is configured to receive a transmission path signal comprising a plurality of signal components, wherein the plurality of signal components comprises at least a first signal component in a first frequency band and a second frequency component in a second frequency band distinct from the first frequency band. The filter circuitry is configured to receive the transmission path signal from the coupling circuitry, to separate the first signal component from the second signal component, and to separately output the first signal component and the second signal component. The power control circuitry is configured to receive the first signal component and the second signal component, and to generate a first power control signal based on the first signal component and a second power control signal based on the second signal component.

Example 2 includes the subject matter of example 1, wherein the filter circuitry comprises a first set of one or more filters that transmit the first frequency component and filter out the second frequency component to output the first signal component on a first path, and a second set of one or more filters that transmit the second frequency component and filter out the first frequency component to output the second signal component on a second path.

Example 3 includes the subject matter of example 2, wherein the first frequency band has a lower frequency than the second frequency band, and wherein the first set of one or more filters comprises at least one of a lowpass filter or a bandpass filter.

Example 4 includes the subject matter of any of examples 2-3, including or omitting optional features, wherein the first frequency band has a lower frequency than the second frequency band, and wherein the second set of one or more filters comprises at least one of a highpass filter or a bandpass filter.

Example 5 includes the subject matter of any of examples 2-4, including or omitting optional features, wherein at least one filter of the first set of one or more filters or at least one filter of the second set of one or more filters comprises a tunable filter.

Example 6 includes the subject matter of any of examples 2-5, including or omitting optional features, wherein the filtering circuitry comprises a plurality of filters switchably connected to the coupling circuitry, and wherein the filtering component is configured to select the first set of one or more filters and the second set of one or more filters from the plurality of filters to connect to the coupling circuitry based on the first frequency band and the second frequency band.

Example 7 includes the subject matter of example 1, wherein the filtering circuitry comprises a plurality of frequency multiplexers configured to separate the first signal component from the second signal component for associated values of the first frequency band and the second frequency band, wherein each of the plurality of frequency multiplexers is switchably connected to the coupling circuitry, and wherein the filtering component is configured to select a single frequency multiplexer of the plurality of frequency multiplexers to connect to the coupling circuitry based on the first frequency band and the second frequency band.

Example 8 includes the subject matter of example 7, wherein each of the plurality of frequency multiplexers is switchably connected to the coupling circuitry via a distinct coupler of a plurality of couplers of the coupling circuitry.

Example 9 includes the subject matter of any of examples 1-8, including or omitting optional features, wherein the plurality of signal components further comprises at least a third signal component in a third frequency band distinct from the first frequency band and the second frequency band, wherein the filter circuitry is further configured to separate the third signal component from the first signal component and the second signal component and to separately output the third signal component, and wherein the power control circuitry is further configured to receive the third signal component and to generate a third power control signal based on the third signal component.

Example 10 includes the subject matter of example 2, wherein the first frequency band has a lower frequency than the second frequency band, and wherein the second set of one or more filters comprises at least one of a highpass filter or a bandpass filter.

Example 11 includes the subject matter of example 2, wherein at least one filter of the first set of one or more filters or at least one filter of the second set of one or more filters comprises a tunable filter.

Example 12 includes the subject matter of example 2, wherein the filtering circuitry comprises a plurality of filters switchably connected to the coupling circuitry, and wherein the filtering component is configured to select the first set of one or more filters and the second set of one or more filters from the plurality of filters to connect to the coupling circuitry based on the first frequency band and the second frequency band.

Example 13 includes the subject matter of example 1, wherein the filtering circuitry comprises a plurality of frequency multiplexers configured to separate the first signal component from the second signal component for associated values of the first frequency band and the second frequency band, wherein each of the plurality of frequency multiplexers is switchably connected to the coupling circuitry, and wherein the filtering component is configured to select a single frequency multiplexer of the plurality of frequency multiplexers to connect to the coupling circuitry based on the first frequency band and the second frequency band.

Example 14 includes the subject matter of example 13, wherein each of the plurality of frequency multiplexers is switchably connected to the coupling circuitry via a distinct coupler of a plurality of couplers of the coupling circuitry.

Example 15 includes the subject matter of example 1, wherein the transmission path signal comprises a forward signal.

Example 16 includes the subject matter of example 1, wherein the transmission path signal comprises a reverse signal.

Example 17 includes the subject matter of any of examples 1-16, including or omitting optional features, wherein the plurality of signal components further comprises at least a third signal component in a third frequency band distinct from the first frequency band and the second frequency band, wherein the filter circuitry is further configured to separate the third signal component from the first signal component and the second signal component and to separately output the third signal component, and wherein the power control circuitry is further configured to receive the third signal component and to generate a third power control signal based on the third signal component.

Example 18 includes the subject matter of example 17, wherein the plurality of signal components further comprises at least a fourth signal component in a fourth frequency band distinct from the first frequency band, the second frequency band and the third frequency band, wherein the filter circuitry is further configured to separate the fourth signal component from the first signal component, the second signal component, and the third signal component and to separately output the fourth signal component, and wherein the power control circuitry is further configured to receive the fourth signal component and to generate a fourth power control signal based on the fourth signal component.

Example 19 includes the subject matter of example 1, wherein the transmission path signal is an inter-band uplink (UL) carrier aggregation (CA) signal.

Example 20 includes the subject matter of example 1, wherein the first signal component and the second signal component are associated with distinct radio access technologies (RATs).

Example 21 includes the subject matter of example 1, wherein the plurality of signal components further comprises at least a third signal component in a third frequency band distinct from the first frequency band and the second frequency band, wherein the filter circuitry is further configured to separate the third signal component from the first signal component and the second signal component and to separately output the third signal component, and wherein the power control circuitry is further configured to receive the third signal component and to generate a third power control signal based on the third signal component.

Example 22 includes the subject matter of example 21, wherein the plurality of signal components further comprises at least a fourth signal component in a fourth frequency band distinct from the first frequency band, the second frequency band and the third frequency band, wherein the filter circuitry is further configured to separate the fourth signal component from the first signal component, the second signal component, and the third signal component and to separately output the fourth signal component, and wherein the power control circuitry is further configured to receive the fourth signal component and to generate a fourth power control signal based on the fourth signal component.

Example 23 is a non-transitory machine-readable medium comprising instructions that, when executed, cause a machine to: receive a transmission path signal comprising a plurality of signal components, each of which is associated with a distinct frequency band of a plurality of frequency bands; filter the transmission path signal to separate the plurality of signal components; generate a plurality of power control signals, wherein each power control signal is associated with a distinct signal component of the plurality of signal components; and adjust the power of one or more signal components of the plurality of signal components, wherein the power of each of the one or more signal components is adjusted based at least in part on the associated power control signal.

Example 24 includes the subject matter of example 23, wherein causing the machine to filter the transmission path signal comprises causing the machine to select, for each of the plurality of signal components, a filter associated with that signal component from among a plurality of filters, wherein the selected filter transmits that signal component and filters out each other signal component of the plurality of signal components.

Example 25 includes the subject matter of example 24, wherein at least one filter of the plurality of filters is a tunable filter.

Example 26 includes the subject matter of example 24, wherein at least one filter of the plurality of filters is a bandpass filter, a highpass filter, or a lowpass filter.

Example 27 includes the subject matter of example 23, wherein causing the machine to filter the transmission path signal comprises causing the machine to select a frequency multiplexer from among a plurality of frequency multiplexers based on the plurality of frequency bands, wherein the selected frequency multiplexer separates the plurality of signal components.

Example 28 includes the subject matter of example 27, wherein causing the machine to receive the transmission path signal comprises causing the machine to receive the transmission path signal via at least one coupler switchably connected to the plurality of frequency multiplexers.

Example 29 includes the subject matter of example 28, wherein the at least one coupler comprises a plurality of couplers, each of which is switchably connected to a distinct frequency multiplexer of the plurality of frequency multiplexers.

Example 30 includes the subject matter of any of examples 23-29, including or omitting optional features, wherein the plurality of signal components comprises more than two signal components.

Example 31 includes the subject matter of example 23, wherein the plurality of signal components comprises more than two signal components.

Example 32 is a system configured for use in a transmitter, comprising transmitter circuitry, coupling circuitry, filter circuitry, and power control circuitry. The transmitter circuitry is configured to receive a first data signal and a second data signal and to generate a combined transmission path signal that comprises a first signal component in a first frequency band based on the first data signal and a second signal component in a distinct second frequency band based on the second data signal. The coupling circuitry is configured to receive the combined path transmission signal via at least one coupler. The filter circuitry is configured to filter the combined path transmission signal to separate the first signal component from the second frequency component, and to separately output the first signal component and the second signal component. The power control circuitry is configured to receive the separately output first and second signal components, and to generate a first power control signal based on the first signal component and a second power control signal based on the second signal component. Additionally, the transmitter circuitry is further configured to adjust a power of the first signal component based at least in part on the first power control signal and to adjust a power of the second signal component based at least in part on the second power control signal.

Example 33 includes the subject matter of example 32, wherein the filter circuit is configured to filter the combined transmission via selecting, based at least in part on the first frequency band and the second frequency band, a first filter and a second filter from a plurality of filters, wherein the first filter is one of a first selected lowpass filter or a first selected bandpass filter, wherein the second filter is one of a second selected highpass filter or a second selected bandpass filter, wherein the first filter and the second filter separate the first signal component from the second signal component.

Example 34 includes the subject matter of example 32, wherein the filter circuit is configured to filter the combined transmission via selecting, based at least in part on the first frequency band and the second frequency band, a frequency multiplexer from a plurality of frequency multiplexers, wherein the selected frequency multiplexer separates the first signal component from the second signal component.

Example 35 is a system configured for use in a transmitter, comprising means for coupling, means for filtering, and means for controlling powers of a plurality of signal components. The means for coupling is configured to receive a transmission path signal comprising a plurality of signal components, wherein the plurality of signal components comprises at least a first signal component in a first frequency band and a second frequency component in a second frequency band distinct from the first frequency band. The means for filtering is configured to receive the transmission path signal from the coupling circuitry, to separate the first signal component from the second signal component, and to separately output the first signal component and the second signal component. The means for controlling powers of the plurality of signal components is configured to receive the first signal component and the second signal component, and to generate a first power control signal based on the first signal component and a second power control signal based on the second signal component.

Example 36 is a system configured for use in a transmitter, comprising means for transmitting, means for coupling, means for filtering, and means for controlling powers of a plurality of signal components. The means for transmitting is configured to receive a first data signal and a second data signal and to generate a combined transmission path signal that comprises a first signal component in a first frequency band based on the first data signal and a second signal component in a distinct second frequency band based on the second data signal. The means for coupling is configured to receive the combined path transmission signal via at least one coupler. The means for filtering is configured to filter the combined path transmission signal to separate the first signal component from the second frequency component, and to separately output the first signal component and the second signal component. The means for controlling powers of the plurality of signal components is configured to receive the separately output first and second signal components, and to generate a first power control signal based on the first signal component and a second power control signal based on the second signal component. Additionally, the means for transmitting is further configured to adjust a power of the first signal component based at least in part on the first power control signal and to adjust a power of the second signal component based at least in part on the second power control signal.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. A system configured for use in a transmitter, comprising:
    coupling circuitry configured to receive a transmission path signal comprising a plurality of signal components, wherein the plurality of signal components comprises at least a first signal component in a first frequency band and a second frequency component in a second frequency band distinct from the first frequency band;
    filter circuitry configured to receive the transmission path signal from the coupling circuitry, to separate the first signal component from the second signal component, and to separately output the first signal component and the second signal component; and
    power control circuitry configured to receive the first signal component and the second signal component, and to generate a first power control signal based on the first signal component and a second power control signal based on the second signal component,
    wherein the filter circuitry comprises a plurality of frequency multiplexers configured to separate the first signal component from the second signal component for associated values of the first frequency band and the second frequency band, wherein each of the plurality of frequency multiplexers is switchably connected to the coupling circuitry, and wherein the filter circuitry is configured to select a single frequency multiplexer of the plurality of frequency multiplexers to connect to the coupling circuitry based on the first frequency band and the second frequency band.

2. The system of claim 1, wherein the filter circuitry further comprises a first set of one or more filters that transmit the first frequency component and filter out the second frequency component to output the first signal component on a first path, and a second set of one or more filters that transmit the second frequency component and filter out the first frequency component to output the second signal component on a second path.

3. The system of claim 2, wherein the first frequency band has a lower frequency than the second frequency band, and wherein the first set of one or more filters comprises at least one of a lowpass filter or a bandpass filter.

4. The system of claim 2, wherein the first frequency band has a lower frequency than the second frequency band, and wherein the second set of one or more filters comprises at least one of a highpass filter or a bandpass filter.

5. The system of claim 2, wherein at least one filter of the first set of one or more filters or at least one filter of the second set of one or more filters comprises a tunable filter.

6. The system of claim 1, wherein each of the plurality of frequency multiplexers is switchably connected to the coupling circuitry via a distinct coupler of a plurality of couplers of the coupling circuitry.

7. The system of claim 1, wherein the transmission path signal comprises a forward signal.

8. The system of claim 1, wherein the transmission path signal comprises a reverse signal.

9. The system of claim 1, wherein the plurality of signal components further comprises at least a third signal component in a third frequency band distinct from the first frequency band and the second frequency band, wherein the filter circuitry is further configured to separate the third signal component from the first signal component and the second signal component and to separately output the third signal component, and wherein the power control circuitry is further configured to receive the third signal component and to generate a third power control signal based on the third signal component.

10. The system of claim 9, wherein the plurality of signal components further comprises at least a fourth signal component in a fourth frequency band distinct from the first frequency band, the second frequency band and the third frequency band, wherein the filter circuitry is further configured to separate the fourth signal component from the first signal component, the second signal component, and the third signal component and to separately output the fourth signal component, and wherein the power control circuitry is further configured to receive the fourth signal component and to generate a fourth power control signal based on the fourth signal component.

11. The system of claim 1, wherein the transmission path signal is an inter-band uplink (UL) carrier aggregation (CA) signal.

12. The system of claim 1, wherein the first signal component and the second signal component are associated with distinct radio access technologies (RATs).

13. A system configured for use in a transmitter, comprising:
- transmitter circuitry configured to receive a first data signal and a second data signal and to generate a combined transmission path signal that comprises a first signal component in a first frequency band based on the first data signal and a second signal component in a distinct second frequency band based on the second data signal;
- coupling circuitry configured to receive the combined transmission path signal via at least one coupler;
- filter circuitry configured to filter the combined transmission path signal to separate the first signal component from the second frequency component, and to separately output the first signal component and the second signal component; and
- power control circuitry configured to receive the separately output first and second signal components, and to generate a first power control signal based on the first signal component and a second power control signal based on the second signal component,
- wherein the transmitter circuitry is further configured to adjust a power of the first signal component based at least in part on the first power control signal and to adjust a power of the second signal component based at least in part on the second power control signal,
- wherein the filter circuitry comprises a plurality of frequency multiplexers configured to separate the first signal component from the second signal component for associated values of the first frequency band and the second frequency band, wherein each of the plurality of frequency multiplexers is switchably connected to the coupling circuitry, and wherein the filter circuitry is configured to select a single frequency multiplexer of the plurality of frequency multiplexers to connect to the coupling circuitry based on the first frequency band and the second frequency band.

14. The system of claim 13, wherein the filter circuit is configured to filter the combined transmission via selecting, based at least in part on the first frequency band and the second frequency band, a first filter and a second filter from a plurality of filters, wherein the first filter is one of a first selected lowpass filter or a first selected bandpass filter, wherein the second filter is one of a second selected highpass filter or a second selected bandpass filter, wherein the first filter and the second filter separate the first signal component from the second signal component.

15. The system of claim 13, wherein the filter circuit is configured to filter the combined transmission via selecting, based at least in part on the first frequency band and the second frequency band, a frequency multiplexer from a plurality of frequency multiplexers, wherein the selected frequency multiplexer separates the first signal component from the second signal component.

\* \* \* \* \*